Sept. 9, 1941.    J. KUNC ET AL    2,255,388
FRACTIONAL PRECIPITATION PROCESS OF PRODUCING HIGH
MOLECULAR WEIGHT POLYMERS
Filed Sept. 21, 1938
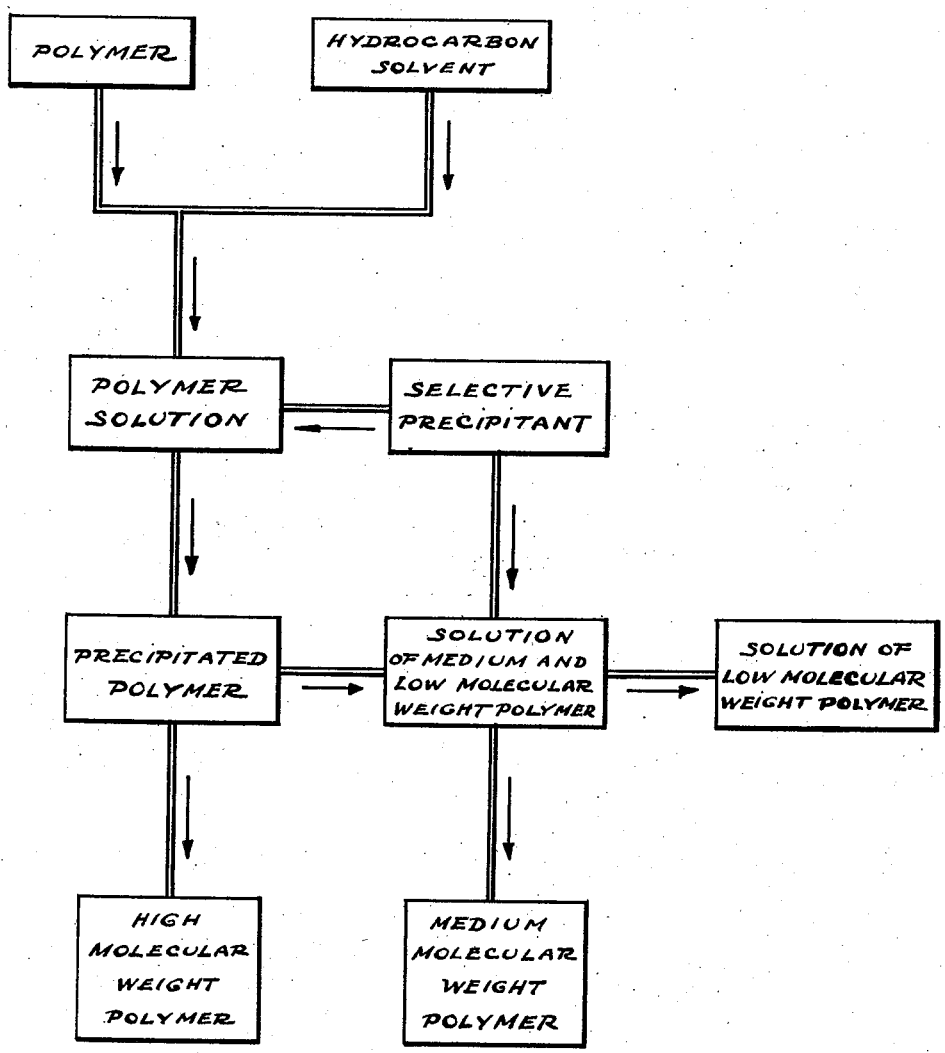

Patented Sept. 9, 1941

2,255,388

UNITED STATES PATENT OFFICE 2,255,388

FRACTIONAL PRECIPITATION PROCESS OF PRODUCING HIGH MOLECULAR WEIGHT POLYMERS

John Kunc and Floyd Laverne Miller, Roselle Park, N. J., assignors to Standard Oil Development Company, a corporation of Delaware Application September 21, 1938, Serial No. 230,992

11 Claims. (Cl. 260—94)

The present invention relates to improved polymers and methods for producing uniform polymer fractions. The invention will be fully understood from the following description:

It is known that valuable hydrocarbon polymers can be produced by the polymerization of olefins, especially iso-olefins such as isobutylene and isoamylene, which polymers are of high molecular weight. The molecular weights obtained depend to some extent on conditions under which the polymerization is effected, but they may readily be obtained in excess of 1,000 and molecular weights may be as high as 15,000; 25,000; 100,000; or even 250,000, by proper selection of the conditions. Polymerization is effected at low temperatures below —20° F., and preferably considerably lower, the iso-olefin being maintained in liquid condition. Preferred catalysts for the purpose are active halide catalysts of the type of boron fluoride, aluminum chloride, titanium fluoride, and the like.

Polymers obtained by the method described above are so-called linear polymers in which the monomeric groups are linked by primary valence bonds so as to form long thread-like chains. These polymers, however, are not uniform but, on the contrary, are mixtures of substances of different molecular weights. The properties of the polymer itself vary considerably with the molecular weight, so that it is desirable for many purposes to fractionate crude polymerates into narrow cuts.

It has been found that such fractionation can be effected quite simply by fractional precipitation, using low molecular weight aliphatic oxygen containing liquids. The polymers are not very soluble in such liquids, but the higher molecular weight compounds are much less soluble than the lower ones and it is thus possible to obtain separation by fractional precipitation.

In order to effect the separation, the crude polymer mixture just as it is produced is dissolved in a suitable solvent. Among such solvents may be mentioned the liquid hydrocarbons, all of which are satisfactory. Among these are naphthas, gasoline, pentane, hexane, octane, kerosene, gas oils, and lubricating oils, as well as aromatic solvents, such as benzol, toluol, xylol, or mixtures of these various substances. Chlorinated solvents may also be used such as carbon tetrachloride, ethylene dichloride, tetrachlorethane, and the like. Carbon bisulphide and similar solvents may also be employed.

The iso-olefin polymer mixture is quite soluble in the classes of solvent mentioned above, but considerable thickening of the solvent results and for this reason solvents of low viscosity are preferred to the more viscous ones, such as lubricating oils, and it is desirable to precipitate relatively dilute solutions of the polymer mixtures.

To a solution of the polymer in one or the other of the solvents mentioned above, relatively small amounts of the aliphatic oxygen containing precipitants are now added slowly and preferably while vigorously agitating. If the mixture is cooled during or after the addition of the precipitant, smaller amounts are necessary for the purpose, but the cooling is not required.

As indicated above, the heavier molecular weight fractions are less soluble than the lower molecular weight fractions in the aliphatic oxygen containing precipitants and in consequence, the first material precipitated contains a higher proportion of heavier molecular weight fractions than did the original polymer. The precipitate is allowed to settle and is removed from the solution and a further quantity of the precipitant is then added so as to cause further precipitation. In this manner, several different polymer fractions may be obtained which have different average molecular weights. If desired, these several fractions may be reworked, that is, redissolved, and precipitated with the same or with different precipitants in order to obtain relatively narrower molecular weight fractions.

The precipitants have been described above as aliphatic oxygen containing liquids of low molecular weight. Of this broad class, the alcohols are a narrower group and of these ethyl, methyl, the propyl, butyl, and amyl alcohols or mixtures of the same are eminently satisfactory. Various ketones may also be used and among these may be mentioned acetone, methyl, ethyl, and diethyl ketone, but there are also other excellent members of the same class. Ethers are less satisfactory because the polymers are more soluble therein and relatively larger amounts are required for the precipitation. Ethyl and propyl ethers, however, may be used. In the same manner, aldehydes, acids, and esters can be employed, but they are also inferior to the alcohols and ketones.

The single figure of the drawing is a flow sheet showing the steps of the process of the invention.

The following example will illustrate the method of the present invention:

*Example 1*

A polyisobutylene polymer mixture was dissolved in 20 volume of benzol and maintained at 20° C., at which temperature the polymer was quite soluble. Acetone was then added in small increments of from 2 to 4% of the solution and after each addition thereof the mixture was thoroughly stirred and the precipitate allowed to settle. The clear liquid was now decanted. In this manner, four separate fractions varying from 35 to 10% of the original polymer were separated and then a relatively large amount of acetone was added so as to precipitate the balance of the polymer from the solution. The amount of each of these various cuts was determined as well as the molecular weight. The molecular weight was determined by the Staudinger method in which 2.8% by weight of the particular polymer was dissolved in tetrahydro naphthalene and the viscosity of this solution relatively to the viscosity of water was determined. The molecular weight is a function of this relative viscosity. In the table below, the data are assembled:

| Polymer cut | Acetone added | Original polymer precipitated | Viscosity of polymer solution relative to water @ 20° C. | Molecular weight |
|---|---|---|---|---|
| | Percent | Percent | | |
| 1 | 2.75 | 35.4 | 10.9 | 21,500 |
| 2 | 4.00 | 25.0 | 7.6 | 20,000 |
| 3 | 6.00 | 13.8 | 6.6 | 14,000 |
| 4 | 10.00 | 10.6 | 5.3 | 11,000 |
| 5 | Sufficient to precipitate all of the remaining polymer. | 15.0 | 3.6 | 6,000 |

Each of the fractions resulting from a first precipitation, as pointed out in the above example, may be still further separated by repeating the solution and precipitation of the respective precipitates with appropriate amounts of precipitant a number of successive times.

*Example 2*

A polyisobutylene polymer, having an average molecular weight of 45,000 was dissolved in 10 volumes of carbon disulphide and the temperature held at 20° C. 3 volumes of ethyl ether were then added and the precipitated polymer collected. This precipitated polymer was redissolved in carbon disulphide and reprecipitated with ethyl ether. After repeating this procedure 8 times, an amount of polymer equal to 3% of the original quantity was recovered as the last precipitate, and this 3% polymer had an average molecular weight of 100,000.

The present invention is not to be limited by any theory of the structure or composition of the polymer mixtures, nor by the use of any particular solvent or precipitant or any particular method of adding the precipitant or effecting the separation, but only to the following claims in which it is desired to claim all novelty inherent in the invention.

We claim:

1. The method for fractionating linear iso-olefin polymer substance comprising dissolving the linear iso-olefin polymer in a hydrocarbon solvent, then adding to the solution a small amount of precipitant comprising an aliphatic combined-oxygen-containing liquid in an amount insufficient to precipitate the entire polymer and collecting the precipitated fractional portion of the polymer mixture.

2. Process according to claim 1 in which a plurality of small amounts of the precipitant are successively added to the solution of the polymer mixture so as to precipitate successive fractions of the polymer and in which the successive precipitates are collected and separated after each successive addition of the precipitant.

3. An improved process for fractionating linear iso-olefin polymer substance comprising dissolving a linear iso-olefine polymer in a liquid hydrocarbon of low viscosity, then adding aliphatic combined-oxygen-containing liquid sufficient in amount to cause partial precipitation of the polymer from the solution and collecting the precipitated higher molecular weight portion.

4. Process according to claim 3 in which the precipitant is a liquid ketone.

5. Process according to claim 3 in which the precipitant is acetone.

6. Process according to claim 3 in which the precipitant is a liquid alcohol.

7. Process according to claim 3 in which the precipitant is an alcohol containing from 1 to 5 carbon atoms.

8. Process according to claim 3 in which the precipitant is ethyl alcohol.

9. In the process of treating a hydrocarbon polymer containing portions having different molecular weights of the type produced by polymerizing iso-olefinic hydrocarbons capable of forming polymeric homologous series by means of a polymerization catalyst of the type of boron fluoride to separate polymers of relatively high molecular weights from those of lower molecular weights, the steps of dissolving the mixture in a non-selective hydrocarbon solvent to produce a solution, adding to the solution a quantity of a selective precipitant, comprising an aliphatic combined-oxygen-containing liquid, said quantity being sufficient at the temperature of the treatment to effect the precipitation of a fraction of relatively high molecular weight polymers of said mixture without causing the precipitation of relatively low molecular weight polymers, and separating the precipitate from the remaining solution.

10. In the process of claim 9, treating the remaining solution with an additional quantity of the same selective precipitant under conditions to cause the precipitation of relatively high molecular weight components contained in the said remaining solution, and separating the precipitate.

11. In the process of claim 9, treating the remaining solution with a quantity of a selective precipitant of a precipitating power which is greater than that of the first selective precipitant, said quantity being sufficient to cause the precipitation of polymers of relatively high molecular weight contained in the said remaining solution, and separating the precipitate.

JOHN KUNC.
FLOYD LAVERNE MILLER.